(12) United States Patent
Balin

(10) Patent No.: US 12,014,560 B2
(45) Date of Patent: *Jun. 18, 2024

(54) DATA EXTRACTION FROM FORM IMAGES

(71) Applicant: ZenPayroll, Inc., San Francisco, CA (US)

(72) Inventor: Quentin Louis Raoul Balin, New York, NY (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,337

(22) Filed: Apr. 18, 2023

(65) Prior Publication Data

US 2023/0252812 A1 Aug. 10, 2023

Related U.S. Application Data

(63) Continuation of application No. 17/887,512, filed on Aug. 15, 2022, now Pat. No. 11,663,841, which is a continuation of application No. 17/082,019, filed on Oct. 28, 2020, now Pat. No. 11,450,128, which is a continuation of application No. 16/283,762, filed on Feb. 23, 2019, now Pat. No. 10,853,639.

(51) Int. Cl.
| | |
|---|---|
| *G06V 30/412* | (2022.01) |
| *G06V 10/24* | (2022.01) |
| *G06V 10/48* | (2022.01) |
| *G06V 30/414* | (2022.01) |
| *G06V 30/416* | (2022.01) |

(52) U.S. Cl.
CPC .......... *G06V 30/412* (2022.01); *G06V 10/242* (2022.01); *G06V 10/48* (2022.01); *G06V 30/414* (2022.01); *G06V 30/416* (2022.01)

(58) Field of Classification Search
CPC .... G06V 30/412; G06V 10/242; G06V 10/48; G06V 30/414; G06V 30/416
USPC ....................................................... 382/176
See application file for complete search history.

(56) References Cited

U.S. PATENT DOCUMENTS

| | | | |
|---|---|---|---|
| 7,356,200 | B2 | 4/2008 | Zuniga |
| 2003/0086615 | A1 | 5/2003 | Dance et al. |
| 2003/0215136 | A1 | 11/2003 | Chao et al. |

(Continued)

OTHER PUBLICATIONS

United States Office Action, U.S. Appl. No. 17/082,019, filed May 12, 2022, 20 pages.

(Continued)

*Primary Examiner* — Juan A Torres
(74) *Attorney, Agent, or Firm* — Fenwick & West LLP

(57) ABSTRACT

An image processing system accesses an image of a completed form document. The image of the form document includes one or more features, such as form text, at particular locations within the image. The image processing system accesses a template of the form document and computes a rotation and zoom of the image of the form document relative to the template of the form document based on the locations of the features within the image of the form document relative to the locations of the corresponding features within the template of the form document. The image processing system performs a rotation operation and a zoom operation on the image of the form document, and extracts data entered into fields of the modified image of the form document. The extracted data can be then accessed or stored for subsequent use.

20 Claims, 4 Drawing Sheets

(56) References Cited

U.S. PATENT DOCUMENTS

| | | |
|---|---|---|
| 2010/0073735 A1 | 3/2010 | Hunt et al. |
| 2011/0123114 A1 | 5/2011 | Hwang et al. |
| 2013/0182959 A1 | 7/2013 | Thrasher et al. |
| 2015/0169951 A1 | 6/2015 | Khintsitskiy et al. |

OTHER PUBLICATIONS

United States Office Action, U.S. Appl. No. 17/887,512, filed Feb. 24, 2023, 29 pages.

FIG. 3A

FORM A $\sigma_1$

Name: _____ M.I. _____
Address: _____
City: _____ Zip: _____
SSN: _____ 
Position: _____
Employer: _____
Dept.: _____ Email: _____
Step: _____ BLI: _____ ACP: _____

FIG. 3B

FORM A $\sigma_2$

Name: Nate  M.I.: B
Address: 123 Main Street
City: San Jose   Zip: 95002
SSN: 000  00  0000
Position: Account Manager
Employer: Company X., Inc.
Dept.: Mgmt   Email: _____
Step: _____ BLI: _____ ACP: _____

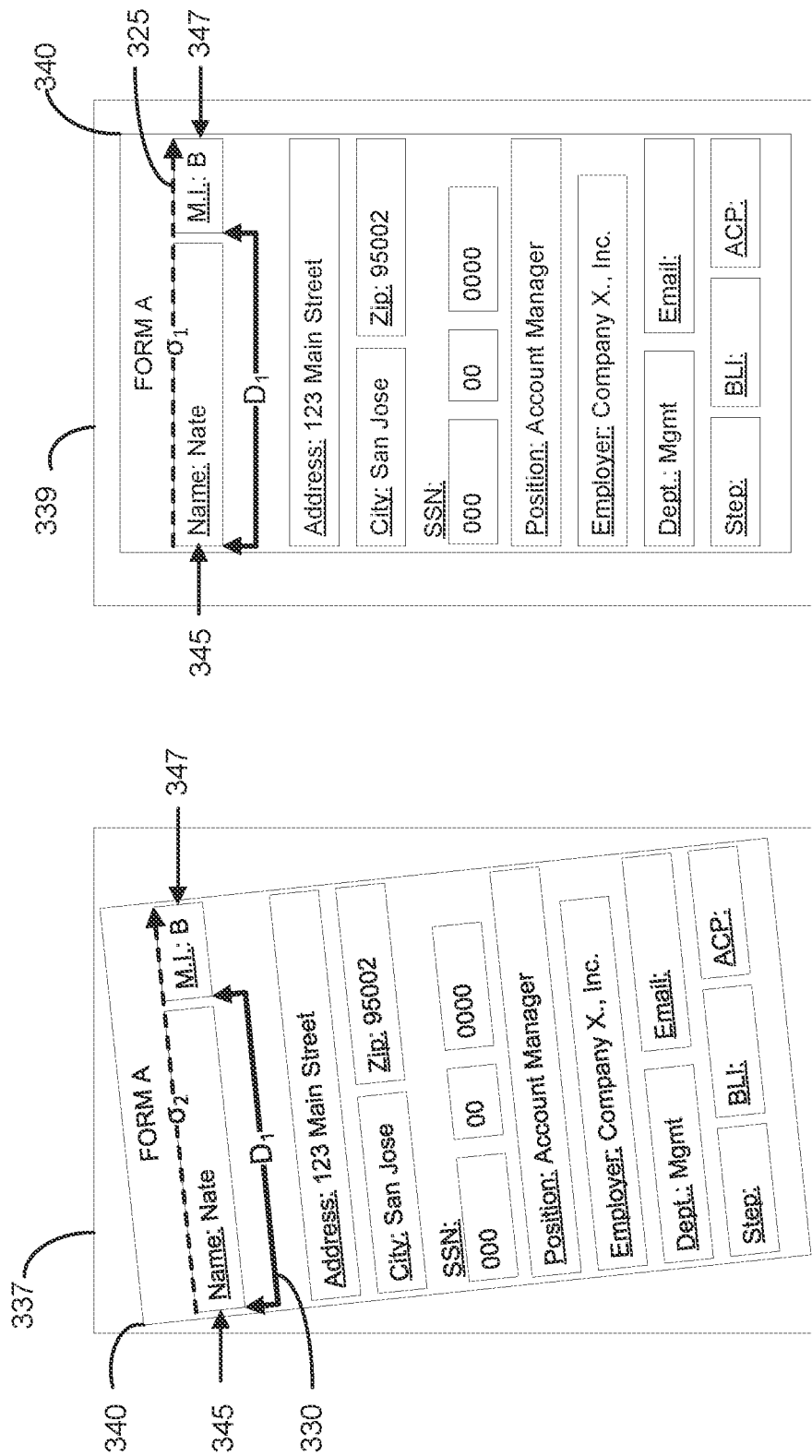

400

Access an image of a form document 405

↓

Access for each of a first set of form text and a second set of form text, a first distance between the first set of form text and second set of form text 410

↓

Access for each of the first set of form text and the second set of form text, a first angle of a line interesting the first set of form text and the second set of form text 415

↓

Determine for each of the first set of form text and second set of form text a corresponding set of image coordinates 420

↓

Compute a second distance between the set of image coordinates corresponding to the first set of form text and the set of image coordinates corresponding to the second set of form text 425

↓

Compute a second angle of a line intersecting the set of image coordinates corresponding to the first set of form text and the set of image coordinates corresponding to the second set of form text 430

↓

Perform a zoom operation on the image of the form document based on a comparison between the first distance and second distance to produce a zoomed form document image 435

↓

Perform a rotation operation on the zoomed formed document image based on a comparison of the first angle and second angle to produce a modified form document image 440

FIG. 4

DATA EXTRACTION FROM FORM IMAGES

CROSS REFERENCE TO RELATED APPLICATIONS

This application is a continuation of U.S. application Ser. No. 17/887,512, filed Aug. 15, 2022, now U.S. Pat. No. 11,663,841, which is a continuation of U.S. application Ser. No. 17/082,019, filed Oct. 28, 2020, now U.S. Pat. No. 11,450,128, which is a continuation of U.S. application Ser. No. 16/283,762, filed Feb. 23, 2019, now U.S. Pat. No. 10,853,639, all of which is incorporated by reference in their entirety.

BACKGROUND

This description generally relates to image processing and in particular to data extraction using image processing techniques.

In current systems, when a user uploads an image of a form document, a human operator must manually extract the data from the form document and enter it into an electronic database. In addition to manual data extraction, human operators must also transform the image in order to properly view the form. For example, when users upload images of form documents that are rotated and/or shifted within the image, too small to read, partly cut-off, a human operator must transform the image before data extraction and entry. As a result, manual image transformation and data extraction are inefficient and are prone to inaccuracies.

SUMMARY

The quality of images of form documents can vary, for instance in orientation, size, image quality, and the like. An image processing engine accounts for and corrects this variation in order to automatically extract data from form documents. To do this, the image processing engine may transform the image of the form document using the location of pre-determined form document features within the image of the form documents and calibration parameters (e.g., a calibration distance and a calibration angle) determined based on a template document. For instance, the image may be zoomed, rotated, and/or shifted when the image is transformed. The image processing engine extracts some or all of the data from the transformed image of the form document. The image processing engine may also transform the coordinates of text within an image of a form document without transforming the image of the form document. The image processing engine extracts some or all of the data from the image of the form document using the transformed coordinates, for instance without necessarily performing the transformation operations described above.

The image processing engine accesses an image of a form document. Images of form documents are provided by users of the image processing engine. Completed form documents are forms containing fields with form text associated with the fields and text entered within the fields. Form text is text describing the field (e.g., "first name" and "address"), and entered text is text entered within the field by an entity completing the form (e.g., the text "Nathan" within a "name" field and the text "123 A Street" within an "address" field). A first distance between a first set of form text and a second set of form text is determined or accessed. Similarly, a first angle between the first set of form text and the second set of form text is determined or accessed. The first distance and the first angle are used as calibration parameters in order to transform the image of the form document, and they may be determined using a template form document.

Image coordinates are determined for each of the first set of form text and second set of form text. Image coordinates may be determined by the image processing engine or by third-party software. The image coordinates may represent a perimeter of a bounding box around form text, an edge of a bounding box around the form text, a corner of a bounding box around the form text, etc. The image processing engine computes a second distance between the set of image coordinates corresponding to the first set of form text and the set of image coordinates corresponding to the second set of form text. Similarly, a second angle of a line intersecting the set of image coordinates between the set of image coordinates corresponding to the first set of form text and the set of image coordinates corresponding to the second set of form text is computed by the image processing engine. In some embodiments, transformation operations, including a zoom operation and a rotation operation, are performed on the image of the form document based on a comparison between the first distance and second distance and based on a comparison between the first angle and second angle to produce a modified form document image. In other embodiments, transformation operations are performed on the image coordinates of the form text and entered text of the image of the form document. Form text and entered text may then be extracted from the image of the form document.

BRIEF DESCRIPTION OF THE DRAWINGS

FIGS. 3A-3D illustrate the process of modifying an image of a form document, according to one embodiment.

FIG. 4 is a flow chart illustrating a method of extracting data from an image of a form document, according to one embodiment.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
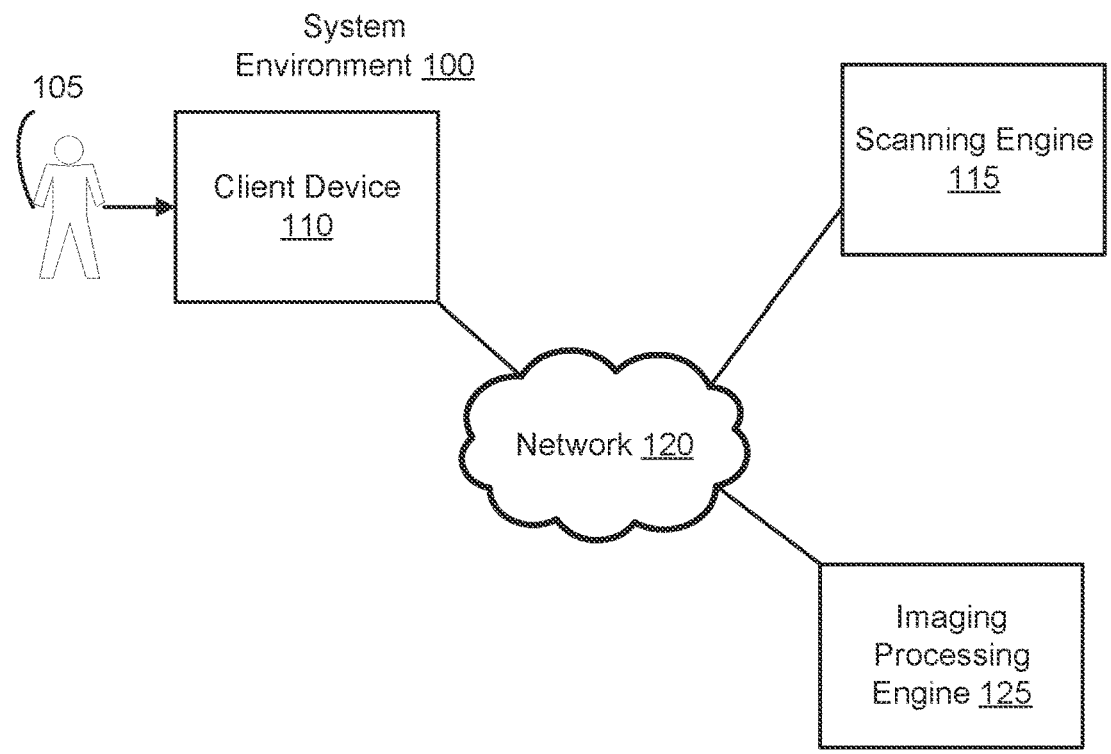
FIG. 1 illustrates a diagram of a system environment of an image processing engine, according to one embodiment.

FIG. 1 illustrates a diagram of a system environment 100 of an image processing engine 125, according to one embodiment. The system environment 100 shown in FIG. 1 includes a user 105, a client device 110, a scanning engine 115, a network 120, and an image processing engine 125. In alternative configurations, different and/or additional components may be included in the system environment 100.

A user 105 of the image processing engine 125 may be an individual or organization. A user 105 may use the image processing engine 125 to extract text from form documents. For example, a user 105 may have hardcopies of form documents for employees, volunteers, customers and/or personnel and may want to translate text from the hardcopies into an electronic database.

The client devices 110 are one or more computing devices capable of receiving user input as well as transmitting and/or receiving data via a network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the image processing engine 125. For example, a client device 110 executes a browser application to enable interaction between the client device 110 and the image processing engine 125 via the network 120. In another embodiment, a client device 110 interacts with the image processing engine 125 through an application programming interface (API) running on a native operating system of the client device 110, such as IOS® or ANDROID™.

The client devices 110 are configured to communicate via a network 120, which may include any combination of local area and/or wide area networks, using both wired and/or wireless communication systems. In one embodiment, a network 120 uses standard communications technologies and/or protocols. For example, a network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques.

The scanning engine 115 is a third-party system that detects and extracts text from images. The scanning engine 115 may extract text from bounding boxes within the images as single strings, words, blocks, and/or paragraphs. The scanning engine 115 also provides the location of each bounding box within the image. For example, the location of each bounding box may be relative to an origin of the image (e.g., a top left corner, image center, etc.), relative to the margins of the image, or relative to other bounding boxes within the image. In some embodiments, a set of coordinates describing a perimeter of each bounding box is provided to the user 105. In other embodiments, coordinates describe one or more corners of the bounding box, a side of the bounding box, or any appropriate bounding box locus. The scanning engine 115 may also extract text from form documents as a grid. For example, the scanning engine 115 may segment a form document into an n-dimensional grid and identify the location of each string, word, etc., relative to its location within the grid. It should be noted that in some embodiments, the scanning engine 115 or software with similar functionality to the scanning engine may be integrated into the image processing engine 125.

The image processing engine 125 extracts data from form documents and/or images of form documents. Form documents include information relevant to the user 105, and/or its employees, personnel, customers, and volunteers, etc. Some or all data may be extracted by the image processing engine 125 based on user preferences and engine settings. Examples of user preferences may include data extraction from certain fields within a form document, preferred separation characters, grid size, etc. Examples of engine settings may include the use of separation characters for identifying separate text portions, scanning grid size, settings governing the upload of images, formats for presenting scanned text and location information, and the like. Data extracted from an image of a form document may be stored in an electronic database, and may also be used to generate electronic versions of the form documents for easy access and sharing among users. Form documents and/or images of form documents may be provided via scan, fax, email, instant message, text/multimedia message, or other electronic conveyance by a user 105 through a user interface or API of the image processing engine 125.

Form documents and images of form documents may vary in quality, even between form documents of the same type. For example, images of form documents may be shifted or rotated relative to the image during scanning, images may be scanned with different levels of resolution, images may be uploaded with different margin sizes, images may be uploaded at different times and/or by different users, and the like. Variation may be a result of manual scanning or faxing, variations in equipment used to provide images of form documents to the image processing engine 125, user error, and the like. To account for this variation, and to automatically extract data from the form documents, the image processing engine 125 performs a calibration on a template form document, and modifies completed form documents of the same form document type until the coordinates or locations of the text in the completed form documents matches or is similar to those in the template form document. A template form document may be an empty form document, a marked-up form document, etc.

Based on the calibration, the image processing engine 125 can extract data from completed form documents. To do this, the image processing engine 125 exports a template form document as an image to the scanning engine 115. The scanning engine provides the extracted text from the template form document and the corresponding locations of the extracted text within the image. The image processing engine 125 identifies a feature within the template form document that will serve as a map to transform the coordinates in completed form documents of the same type as the template form document. Data is then extracted from the completed form documents using the transformed coordinates of the completed form documents, for subsequent use, display, and/or storage.

Image Processing Engine

Figure 2:
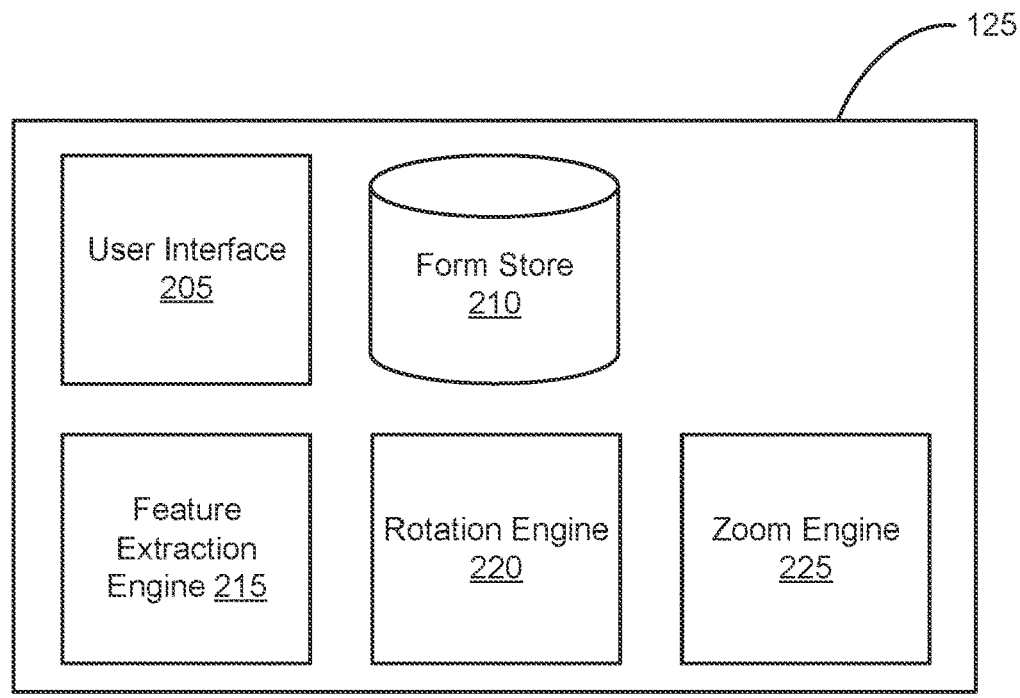
FIG. 2 is a block diagram of an architecture of the image processing engine, according to one embodiment.

FIG. 2 is a block diagram of an architecture of the image processing engine 125, according to one embodiment. The image processing engine 125 shown in FIG. 2 includes a user interface 205, a form store 210, a feature extraction engine 215, a rotation engine 220, and a zoom engine 225. In other embodiments, the image processing engine 125 may include additional, fewer, or different components for various applications. Conventional components such as security functions, load balancers, failover servers, management and network operations consoles, and the like are not shown so as to not obscure the details of the system architecture.

The user interface 205 allows a user 105 to interact with the image processing engine 125. Through the user interface 205, a user 105 can upload form document images, view and modify data extracted from form documents, select form document features, identify templates, and the like.

A form document may include declarative information about an employee that was provided by the employee, for instance at the time of hiring the employee. Each form document includes multiple fields, each for the entry of information corresponding to one or more attributes of an employee. Examples of form documents include new hire form documents, emergency contact form documents, medical form documents, tax documents, insurance documents, etc. Each field either includes or is adjacent to form text associated with the field. For example, a "name" field, a "date of birth" field, a "primary cardholder" field, etc. Each field also includes a space for entered text submitted by the employee or user 105. For example, a user 105 may enter "Ariel," Apr. 19, 2001," and "Rikki" for the "name," "date of birth," and "primary cardholder" fields, respectively. It should be noted that form documents may also include fields that do not include or are adjacent to text, though for the purposes of simplicity, such fields aren't discussed further. In addition, it should be noted that although various form documents described herein are associated with employees or employers, in practice, the functionalities described herein can be performed on any type of form document.

The form store 210 stores form documents and images of form documents, for instance from a user 105 of the image processing engine 125. The form store 210 also stores extracted form text and entered text of each form document, the location of extracted form and entered text, metadata associated with the form documents and form document images, and user preferences. Metadata may include the data and time a form document was processed, document author, form document type, form document identification number, modifications performed, identity of the user 105, employee identity or employer identity, and the like. User preferences may include which form document and feature should be used during calibration, which data is extracted from each form document, how data is stored, a threshold level of similarity between templates and completed form documents, and the like.

The feature extraction engine 215 identifies two or more ordered features in template form documents that can be used as candidate features for calibration. Candidate features include unique, identifiable strings of form text in the form document that can be used to set the calibration parameters (e.g., a calibration distance and a calibration angle). For example, candidate features may include words, symbols, logos, and the like. The features ideally do not appear more than once in the template form document; however, portions of the features may appear more than once in the template form document. The feature extraction engine 215 identifies features for calibration and computes a calibration distance and a calibration angle. In other embodiments, the user 105 may identify candidate features on the user interface 205 of the image processing engine 125. The calibration distance is the distance between the two or more features and will be used to determine the percent enlargement required for each completed form document. The calibration angle is the angle of a line intersecting the two or more features and will be used to determine the degree of rotation required for each completed form document.

The calibration distance and calibration angle are computed using coordinates of the feature within the image of the form document retrieved from the scanning engine 115. To retrieve the coordinates of the feature, the feature extraction engine 215 exports an image of a template form document to the scanning engine 115 and receives the text and coordinates from some or all fields in the template form document. The feature extraction engine 215 identifies coordinates of the two or more features and computes the calibration distance and calibration angle. The calibration distance and calibration angle may be calculated using a single pair of coordinates for each feature, a set of coordinates describing the bounding box of each feature, a portion of the bounding box, etc. The feature extraction engine 215 provides the computed calibration distance and calibration angle to the rotation engine 220, zoom engine 225, and/or form store 210. In some embodiments, the feature extraction engine 215 may use the extracted text and coordinates of the template form document to generate an electronic version of the template form document. Electronic versions of the form documents can then be populated with information extracted from completed form documents and stored in the form store 210. From the form store 210, a user 105 may access, modify, and share data from the form documents using the user interface 205.

The feature extraction engine 215 also retrieves data from completed form documents. The feature extraction engine 215 exports completed form documents to the scanning engine 115, and imports the extracted form text, entered text, and location information describing locations of features and text within the completed form document. In some embodiments, the feature extraction engine 215 calculates the distance between the two or more features ("form feature distance") and the angle of the line intersecting the two or more features ("form feature angle"). In these embodiments, the feature extraction engine 215 provides the calculated form feature angle to the rotation engine 220 and the calculated form feature distance to the zoom engine 225. In other embodiments, the feature extraction engine 215 provides the coordinates of the features to the rotation engine 220 and/or zoom engine 225. In these embodiments, the rotation engine 220 uses the coordinates of the features to compute form feature angle, and the zoom engine 225 uses the coordinates to compute the form feature distance. As described below, the rotation engine 220 and zoom engine 225 perform a rotation operation and a zoom operation on the image of the form document using the form feature angle and form feature distance, and the calibration angle and calibration distance.

The rotation engine 220 and the zoom engine 225 use the form feature angle, the form feature distance, the calibration angle, and calibration distance to zoom and rotate the image of the form document in one of at least two ways. In a first embodiment, the rotation engine 220 rotates the image of the form document based on a difference between the form feature angle and the calibration angle, and the zoom engine 225 zooms the rotated image of the form document based on a difference between the form feature distance and the calibration distance. The zoomed and rotated image of the form document is then sent to the scanning engine 115 for re-scanning, and the scanning engine provides updated locations for features and text of the zoomed and rotated image. In a second embodiment, the rotation engine 220 modifies the coordinates of each feature and/or text within the image of the form document based on one or more of 1) a difference between the form feature angle and the calibration angle, 2) based on a difference between the form feature distance and the calibration distance, 3) based on a location of a particular feature or text relative to a reference point of the image of the form document, and 4) based on a distance between the location of the particular feature or text relative to the reference point of the image of the form document. In such an embodiment, the location or coordinates of features and/or text of the image of the form document can be transformed such that each field of the image of the form document can correspond to an associated field of the template form document, and the text of such fields can be extracted without requiring the image of the form document to be rescanned by the scanning engine 115.

The rotation engine 220 computes the degree of rotation required to transform completed form documents to match the calibrated template form document. To do this, the rotation engine 220 compares the calibration angle to the form feature angle. If the difference between the calibration angle and form feature angle is greater than a threshold angle, the rotation engine 220 rotates the image of the completed form document and/or coordinates of the completed form document until the difference is within a threshold angle. The rotation may be based on the position of each word in the form document, the position of each word relative to the features, the position of each word relative to the image, etc. Likewise, the rotation engine 220 may rotate the image until a top of the form is aligned with a top of the image, or may rotate the image by an amount equal to the form feature angle (e.g., in embodiments where the form feature angle is measured relative to a properly aligned form document). In some embodiments, the rotated image and/or coordinates of the image are provided to the zoom engine 225. In other embodiments, images of form documents are first processed by the zoom engine 225 and then by the rotation engine 220.

The zoom engine 225 computes a percentage that a completed form document must be enlarged or shrunk to match the calibrated template form document. The zoom engine 225 compares the form feature distance of each completed form document to the calibration distance. If the form feature distance is smaller than the calibration distance is greater than a threshold distance, zoom engine 225 enlarges the image and/or coordinates of the completed form document until the difference is less than the threshold distance. If the form feature distance is greater than the calibration distance by more than a threshold distance, zoom engine 225 shrinks the image and/or coordinates of the completed form document until the difference is less than the threshold distance. In some embodiments, different or additional operations may be performed on the image of the form document to align it with the image of the template form document. For example, a shift operation may be performed on the image and/or coordinates of the completed form document when the features in the image of the completed form document are shifted relative to the features in the image of the template form document by more than a threshold distance.

The enlarged and rotated image and/or coordinates are provided to the feature extraction engine 215. The feature extraction engine 215 uses the coordinates to identify the entered text for each field in the completed form documents. The entered text may be stored in the form store 210 and provided to the user for display on an element of the user interface 205. The entered text may also be used to generate electronic versions of the completed form documents. The electronic form documents may be stored in the form store 210 or in a third-party database from where they can be accessed by a user 105. In some embodiments, the enlarged and rotated image is provided to the scanning engine 115 to obtain additional coordinates describing features, fields, and text of the enlarged and rotated image.

FIGS. 3A-3D illustrate the process of transforming an image of a form document, according to one embodiment. FIG. 3A illustrates an image 305 of a template form document 310. In the example shown, the template form document 310 is fully within the margins of the image 305, has the same orientation as the image 305, and fills the image 305 without cutting off any portion of the template form document 310. In other examples, the template form document 310 may be shifted within the image 305 and/or rotated within the image 305. The template form document includes multiple fields, including the "name" field 315, "M.I." field 317, and "SSN" field 320. Form text, e.g., "name," "M.I," and "SSN" may be located within the field, as shown in the "name" field 315 and in the "M.I." field 317, or it may be located adjacent to the field, as shown in the "SSN" field 320. The template form document 310 does not include entered text (i.e., text entered by a user, employee, volunteer, etc.); however, template form documents may contain entered text.

The scanning engine 215 determines the text and coordinates of text within the image 305, and the feature extraction engine 215 identifies which coordinates correspond to the features. In template form documents where a portion of the features appears more than once in the form, the feature extraction engine 215 may use Hough transforms or other suitable feature identification algorithms to identify the location of the features. For example, features may include "DOB," "address," and "phone" and other instances of "address" and "phone" appear within the form. The feature extraction engine 215 identifies which instances of "address" and "phone" correspond to the features. The features in the template form document 310 contains the "name" field 315 and the "M.I." field 317. In other examples, features may include different or additional words, symbols and/or logos. Additionally, features may be adjacent vertically and/or horizontally.

$\sigma_1$ 325, represented as a dashed line, is the calibration angle of the image 305 of the template form document 310. In the illustration shown, $\sigma_1$ 325 is the angle of a line intersecting the "name" field 315 and the "M.I." field 317. $\sigma_1$ 325 may be calculated using some or all of the coordinates that describe the bounding box around the features, e.g., the boxes around "name" field 315 and the "M.I." field 317. $\sigma_1$ 325 may also be calculated using any coordinates that represent the location of the features within the image 305.

$D_1$ 330 is the calibration distance of the image 305 of the template form document 310. In the illustration shown in FIG. 3A, $D_1$ 330 is the distance between the "name" field 315 and the "M.I." field 317. $D_1$ 330 is calculated from the bottom left corner of "name" field 315 and the bottom left corner of the "M.I." field 317. $D_1$ 330 $D_1$ 330 may also be calculated using any coordinates that represent the location of the features within the image 305. For example, $D_1$ 330 may be calculated from the mid-point of each field, the inner corners of the fields, the outer corners of the fields, and the like. In other examples, $D_1$ 330 may be calculated as the width of the margins between the edge of the image 305 and the features within the template form document 310. For example, $D_1$ 330 may be the distance between a left margin of the image 305 and the "name" field 315, and a second distance may be calculated between a right margin of the image and the "M.I." field 317.

FIG. 3B illustrates an image 335 of a completed form document 340. The completed form document 340 is a version of the template form document 310 in which entered text has been inputted into a portion of the fields. For example, the "name" field 345 of the completed form document 340 includes the name "Nate" and the "M.I." field 347 of the completed form document 340 includes the letter "B." As shown in the FIG. 3B, the size of the image 335 of the completed form document 340 is the same size of the image 305 of the template form document 310. In other embodiments, the image of template form document does not have to be the same size as the image of the completed form document. Similarly, other image characteristics do not need to be similar across the images of template and completed form documents, e.g., the resolution, orientation, aspect ratio, color, etc.

The size and orientation of the completed form document 340 within its respective image, e.g., image 335, are not the same as those of the template form document 310 within its respective image, e.g., image 305. In particular, the completed form document 340 is rotated counterclockwise within the frame of the image 335 and is smaller relative to the template form document 310. Variations in size, orientation, and image quality may be a result of the user how scanned the form documents, the equipment used to scan the form documents, the third-party software, etc.

$\sigma_2$ 350, represented as a dashed line, is the form feature angle of the completed form document 340. The difference in the calibration angle, $\sigma_1$ 325, and the form feature angle, $\sigma_2$ 350, is computed by the rotation engine 220. In some embodiments, if the difference is greater than the predetermined threshold, the rotation engine 220 rotates the image 335 of the completed form document 340 until $\sigma_2$ 350 is within a threshold angle of $\sigma_1$ 325.

$D_2$ 355 is the form feature distance of the completed form document 340. The difference in the calibration distance, $D_1$ 330, and the form feature distance, $D_2$ 355, is computed by the zoom engine 225. In some embodiments, if the difference is greater than the predetermined threshold, the zoom engine 225 enlarges the image 335 of the completed form document 340 until $D_2$ 355 is within a threshold distance of $D_1$ 330.

FIG. 3C illustrates an enlarged image 337 of the completed form document 340. Based on the difference between the calibration distance, $D_1$ 330, and the form feature distance, $D_2$ 355, the zoom engine 225 transforms the image of the form feature document and/or the coordinates of all form text and entered text within the image 337 of the completed form document 340 until the form feature distance, $D_2$ 355, is within a threshold distance of the calibration distance, $D_1$ 330. As shown, the image of the completed form document 340, e.g., image 337, is enlarged until the distance between the "name" field 345 and "M.I." field 347 is $D_1$ 330.

FIG. 3D illustrates an enlarged and rotated image 339 of the completed form document 340. The rotation engine 220 rotates the image of the completed form document 340 or transforms the coordinates of all form text and entered text within the image 339 of the completed form document 340 until the form feature angle, $\sigma_2$ 350, is within a threshold angle of calibration angle, $\sigma_1$ 325. As shown, the image of the completed form document 340, e.g., image 339, is rotated until the angle of a line intersecting the "name" field 345 and "M.I." field 347 is $\sigma_1$ 325. In some embodiments, different or additional operations may be performed on the image of the completed form document. For example, a shift operation may be performed on the image of the completed form document to align the image of the form document with the image of the template form document.

In some embodiments, the transformed image may be sent to the scanning engine 115 in order for the feature extraction engine 215 to retrieve the form text, entered text, and corresponding coordinates of the completed form documents. The feature extraction engine 21 may then extract data from the completed form documents. In other embodiments, the transformed coordinates may be sent to the feature extraction engine 215 to directly extract data from the completed form documents.

In other embodiments, form text and entered text are extracted from form documents without transforming the image of the form document. In these embodiments, the coordinates of the form text and location text of the image of the form document are transformed using the calibration angle, calibration distance, form feature angle, and form feature distance. For example, if the difference between the calibration angle and form feature angle is greater than a predetermined threshold, the rotation engine 220 recomputes the coordinates of the form text and entered text in the form document until the form feature angle is within a threshold angle of the calibration angle. Further, if the difference in the calibration distance and the form feature distance is greater than a predetermined threshold, the zoom engine 225 recomputes the coordinates of the form text and entered text until the form feature angle is within a threshold distance of the calibration angle. In these embodiments, form text and entered text can be extracted from images of form documents without re-sending the images of form documents to the scanning engine 115.

FIG. 4 is a flow chart illustrating a method 400 of extracting data from an image of a form document, according to one embodiment. An image of a form document is accessed 405 by the image processing engine 125. In some embodiments, images of form documents are provided by a user 105 of the image processing engine 125. In other embodiments, images of form documents are accessed 405 from a form store 210 or from a third-party electronic database. Form documents include fields, and each field includes form text and entered text. For each of a first set of form text and a second set of form text, a first distance between the first set of form text and second set of form text is accessed 410. The first distance may be accessed 410 from the feature extraction engine 215, the scanning engine 115, the form store 210, etc. In some embodiments, the first distance may be a calibration distance computed by the feature extraction engine 215 using a template form document, the image of the form document, a different image of a different form document, etc. For each of the first set of form text and the second set of form text, a first angle of a line interesting the first set of form text and the second set of form text is accessed 415. The first angle may be accessed 410 from the feature extraction engine 215, the scanning engine 115, the form store 210, etc. In some embodiments, a first angle may be a calibration angle computed by the feature extraction engine 215 using a template form, the image of the form document, a different image of a different form document, and the like.

For each of the first set of form text and second set of form text, a corresponding set of image coordinates are determined 420. The image coordinates represent the location of the form text relative to the image of the form document. In some embodiments, the image coordinates represent a perimeter of a bounding box around form text, an edge of a bounding box around the form text, a corner of a bounding box around the form text, etc. A second distance between the set of image coordinates corresponding to the first set of form text and the set of image coordinates corresponding to the second set of form text is computed 425. Similarly, a second angle of a line intersecting the set of image coordinates between the set of image coordinates corresponding to the first set of form text and the set of image coordinates corresponding to the second set of form text is computed 430. A zoom operation on the image of the form document is performed 435 based on a comparison between the first distance and second distance to produce a zoomed form document image. A rotation operation on the image of the form document is performed 440 based on a comparison between the first angle and second angle to produce a modified form document image. In some embodiments, a shift operation may also be performed on the image of the form document to align the image of the completed document to an image of a template form document. Text is then extracted from the modified form document image, and each portion of extracted text is associated with a field of the form document that aligns or corresponds to the location of the portion of extracted text within the modified form document. The extracted text can then be used, displayed, modified, or stored for subsequent use and access.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing an image of a form document comprising a plurality of fields, wherein each field includes or is adjacent to a set of form text associated with the field; and
   modifying the image of the form document by:
      performing a zoom operation on the image of the form document based on a desired size of the modified form document; and
      performing a rotation operation on the image of the form document image based on a computed angle between a first set of form text and a second set of form text.

2. The method of claim 1, wherein the first set of form text is associated with a first bounding box around the first set of form text and the second set of form text is associated with a second bounding box around the second set of form text within the image.

3. The method of claim 2, wherein the zoom operation is based on a computed distance between a corner of the first bounding box and a corresponding corner of a second bounding box.

4. The method of claim 3, wherein performing the zoom operation comprises:
   if the computed distance is greater than a threshold distance, modifying dimensions of the image by a factor selected based on the computed distance.

5. The method of claim 1, wherein performing the rotation operation comprises:
   if the computed angle is greater than a threshold angle, modifying an orientation of the image by a factor selected based on the computed angle.

6. The method of claim 1, further comprising:
   retrieving entered text from a field of the modified form document image;
   identifying a field of the form document corresponding to the field of the modified form document image; and
   modifying a database field corresponding to the identified field of the form document to include the retrieved entered text.

7. The method of claim 1, further comprising:
   automatically scanning entered text of each field from the modified form document image.

8. The method of claim 1, wherein the desired size of the modified form document comprises a predetermined size corresponding to a type of the form document.

9. A non-transitory computer-readable storage medium containing computer program code that, when executed by a processor, causes the processor to perform steps comprising:
   accessing an image of a form document comprising a plurality of fields, wherein each field includes or is adjacent to a set of form text associated with the field; and
   modifying the image of the form document by:
      performing a zoom operation on the image of the form document based on a desired size of the modified form document; and
      performing a rotation operation on the image of the form document image based on a computed angle between a first set of form text and a second set of form text.

10. The non-transitory computer-readable storage medium of claim 9, wherein the first set of form text is associated with a first bounding box around the first set of form text and the second set of form text is associated with a second bounding box around the second set of form text within the image.

11. The non-transitory computer-readable storage medium of claim 10, wherein the zoom operation is based on a computed distance between a corner of the first bounding box and a corresponding corner of a second bounding box.

12. The non-transitory computer-readable storage medium of claim 11, wherein performing the zoom operation comprises:
if the computed distance is greater than a threshold distance, modifying dimensions of the image by a factor selected based on the computed distance.

13. The non-transitory computer-readable storage medium of claim 9, wherein performing the rotation operation comprises:
if the computed angle is greater than a threshold angle, modifying an orientation of the image by a factor selected based on the computed angle.

14. The non-transitory computer-readable storage medium of claim 9, wherein the program code, when executed by the processor, causes the processor to perform further steps comprising:
retrieving entered text from a field of the modified form document image;
identifying a field of the form document corresponding to the field of the modified form document image; and
modifying a database field corresponding to the identified field of the form document to include the retrieved entered text.

15. A system comprising:
a hardware processor; and
a non-transitory computer-readable medium containing instructions that, when executed by the hardware processor, cause the hardware processor to:
access an image of a form document comprising a plurality of fields, wherein each field includes or is adjacent to a set of form text associated with the field; and
modify the image of the form document by:
performing a zoom operation on the image of the form document based on a desired size of the modified form document; and
performing a rotation operation on the image of the form document image based on a computed angle between a first set of form text and a second set of form text.

16. The system of claim 15, wherein the first set of form text is associated with a first bounding box around the first set of form text and the second set of form text is associated with a second bounding box around the second set of form text within the image.

17. The system of claim 16, wherein the zoom operation is based on a computed distance between a corner of the first bounding box and a corresponding corner of a second bounding box.

18. The system of claim 17, wherein performing the zoom operation comprises:
if the computed distance is greater than a threshold distance, modifying dimensions of the image by a factor selected based on the computed distance.

19. The system of claim 15, wherein performing the rotation operation comprises:
if the computed angle is greater than a threshold angle, modifying an orientation of the image by a factor selected based on the computed angle.

20. The system of claim 15, further containing instructions that cause the hardware processor to:
retrieve entered text from a field of the modified form document image;
identify a field of the form document corresponding to the field of the modified form document image; and
modify a database field corresponding to the identified field of the form document to include the retrieved entered text.

\* \* \* \* \*